United States Patent
Hanna et al.

[11] Patent Number: 5,765,773
[45] Date of Patent: Jun. 16, 1998

[54] RETRACTOR ENGAGEMENT MECHANISM

[75] Inventors: Harry Hanna, Craigavon; Ian Dawson, Belfast, both of United Kingdom

[73] Assignee: European Components Co. Limited, Belfast, United Kingdom

[21] Appl. No.: 791,322

[22] Filed: Jan. 31, 1997

[30] Foreign Application Priority Data

Feb. 12, 1996 [GB] United Kingdom .................... 9602803

[51] Int. Cl.⁶ .................................................. B60R 22/41
[52] U.S. Cl. ................................................... 242/383.2
[58] Field of Search ........................... 242/383.1, 383.2, 242/384.1

[56]          References Cited

U.S. PATENT DOCUMENTS 5,390,873  2/1995  Fujimura et al. ............ 242/383.2
5,669,573  9/1997  Hirzel ........................ 242/383.1

FOREIGN PATENT DOCUMENTS 0 273 584  7/1988  European Pat. Off. ........... 242/383.1
2 263 625  8/1993  United Kingdom .

Primary Examiner—John P. Darling
Attorney, Agent, or Firm—Foley & Lardner

[57]              ABSTRACT

A retractor engagement mechanism for locking a shaft against rotation relative to a frame, the mechanism comprising a pawl 7 mounted eccentrically on the shaft so as to rotate therewith and being moveable into engagement with ratchet teeth 9 on the frame. Lock gear 4 is selectively rotatable with the shaft and a cam-follower connection between lock gear 4 and pawl 7, to cam pawl 7 into engagement when lock gear 4 is prevented from rotating with the shaft, for example by a sensor mechanism. A pivotally mounted counterbalancing mass 10 which preferably pivots substantially co-axially with the shaft is provided to apply to pawl 7 a torque which opposes movement into engagement, thereby to delay that engagement.

6 Claims, 4 Drawing Sheets

RETRACTOR ENGAGEMENT MECHANISM

The present invention relates to an engagement mechanism for locking a shaft against rotation relative to a frame.

In particular, the present invention may be used in a retractor, such as a seat belt retractor in which webbing is wound around a shaft and the engagement mechanism is used to prevent further extraction of the webbing.

A known seat belt retractor mechanism comprises a pawl mounted to pivot eccentrically to a shaft which rotates in a frame. The pawl is engageable with ratchet teeth formed on the frame. Such engagement is controlled by a lock gear which normally rotates with the shaft, but which may be stopped by operation of a sensor mechanism. Continued rotation of the shaft causes a cam-follower arrangement between the pawl and the lock gear to bias the pawl into correctly aligned engagement with the teeth of the frame. The engagement halts rotation of the shaft preventing additional payout of webbing.

Such operation will be understood from GB-A-2,263,625 which discloses a mechanism having two such pawls, one backing-up the other.

In the known mechanism, the engagement is difficult to control. For example, when the known mechanism is used with a pyrotechnic buckle pretensioner, which applies a very high acceleration to the webbing, the inertia of the lock gear and the centrifugal force of the pawl cause the pawl to move outwardly and engage the ratchet teeth of the frame in a manner which is particularly difficult to control.

The present invention improves on the known mechanism by providing a retractor engagement mechanism comprising:

a frame;

a ratchet on said frame;

a shaft for windably receiving a webbing said shaft having an axis;

means mounting said shaft rotatably in said frame so as to be rotatable about said axis;

a pawl;

means mounting said pawl eccentrically with respect to said shaft, whereby said pawl is rotatable together with said shaft around said axis of said shaft and whereby said pawl is movable on its mounting into engagement with said ratchet on said frame effective to lock said shaft against rotation relative to said frame;

a lock gear selectably rotatable with said shaft;

a cam-follower connection between said lock gear and said pawl effective to cam said pawl into said engagement when said lock gear is prevented from rotating with said shaft; and a rotatably mounted counterbalancing mass engagable with said pawl for applying to said pawl a force which opposes movement into said engagement, thereby to delay said engagement. This improves the control of the engagement.

Preferably, said pawl is rotatably mounted and said force applied to said pawl to oppose movement into said engagement produces a torque about the mounting.

Desirably, such a counterbalancing mass pivots substantially coaxially with the shaft. This is convenient in manufacture of the engagement mechanism and allows maximisation of the moment of inertia of the mass.

Advantageously, the pawl is engagable with the counterbalancing mass by means of contact between an engagement portion connected to the pawl and a contact surface formed on the counterbalancing mass.

A further advantage occurs when the present invention is used with a retractor pretensioner, where the webbing is wound very rapidly onto the retractor. In this case, at the end of retraction a deceleration occurs which tends to move the pawl outwardly into engagement. However, this is prevented by the opposing torque from the counterbalancing mass.

Using a retractor pretensioner, though, a problem can occur during the acceleration phase, in that the inertia of the counterbalancing mass can cause it to contact the pawl engagement portion and produce a torque pushing the pawl into unwanted engagement. This problem may be solved by shaping the engagement portion and the counterbalancing mass such that the force applied to the pawl acts substantially through the pivot point of the pawl. This minimises the torque on the pawl, reducing it to zero if the contact force acts exactly through the pivot.

In order that the invention may be better understood, the following non-limitative description is given with reference to the accompanying figures, in which.

Figure 1:
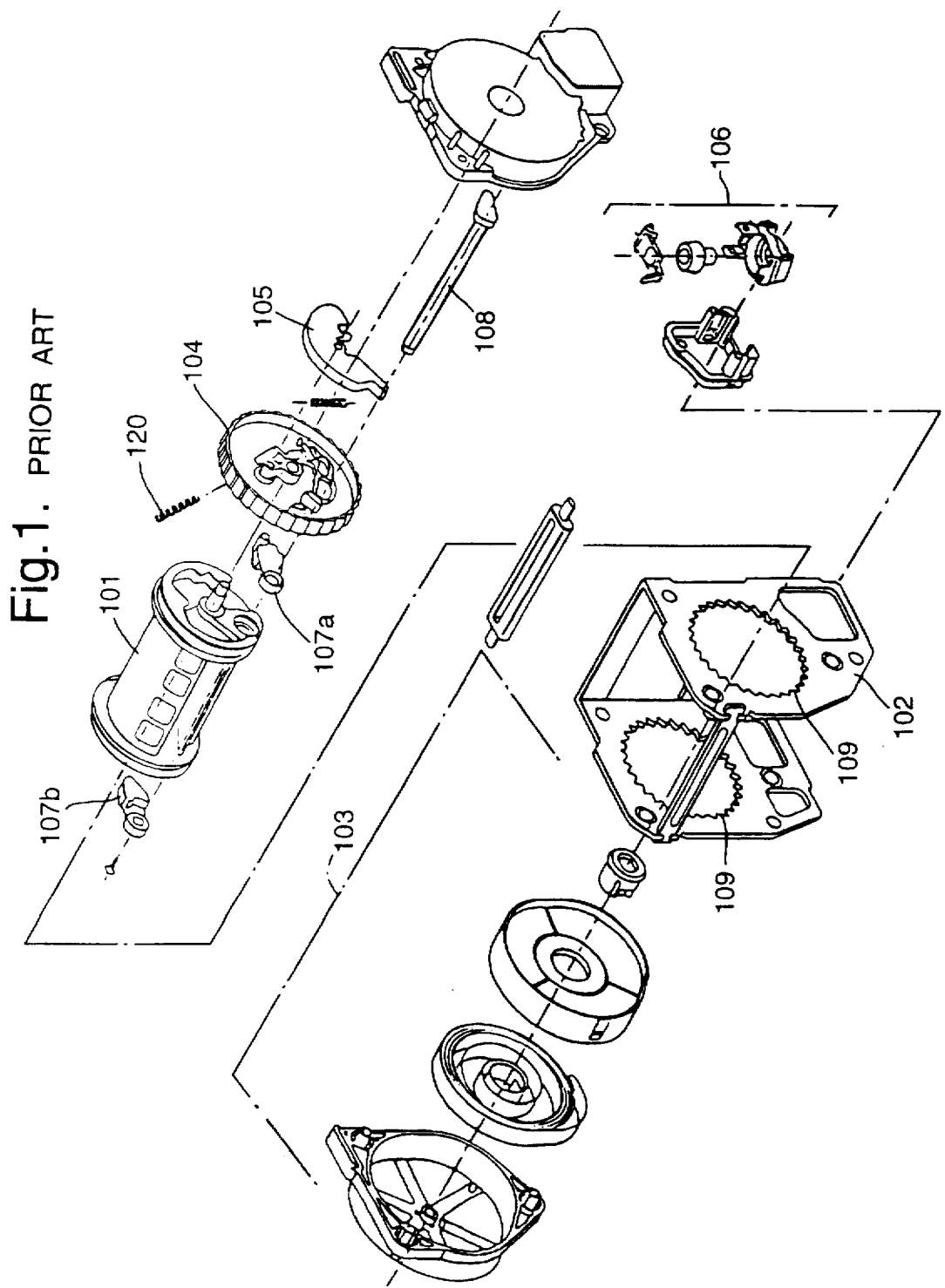
FIG. 1 shows an exploded view of a known seat belt retractor mechanism.

FIG. 1 shows an exploded view of a known seat belt retractor mechanism which includes a shaft (or spindle) 101 mounted in a frame 102 and biassed in a belt-winding direction by return spring mechanism 103. Lock gear (or ratchet wheel) 104 normally rotates with shaft 101 but may be locked against rotation in the belt-retraction direction by either of an inertia sensor 105 which reacts to acceleration of the shaft in a belt-retraction direction or a deceleration sensor 106 which reacts to deceleration of the vehicle in which the mechanism is mounted.

Pawls 107a and 107b are pivotally and eccentrically mounted to shaft 101 so as to rotate therewith. Pawl 107a is normally biased out of engagement with ratchet teeth 109 by a relatively weak spring 120. By means of cam-follower arrangements between lock gear 104 and pawl 107a, and also between lock gear 104 and joint pin 108 (with which pawl 107b turns) relative rotation between lock gear 104 and shaft 101 cams pawls 107a and 107b into engagement with ratchet teeth 109 of frame 102, subsequently to stop rotation of shaft 101.

A similar mechanism is described in GB-A-2,263,625, and so the construction and operation thereof may be further understood by reference to that document.

Figure 2:
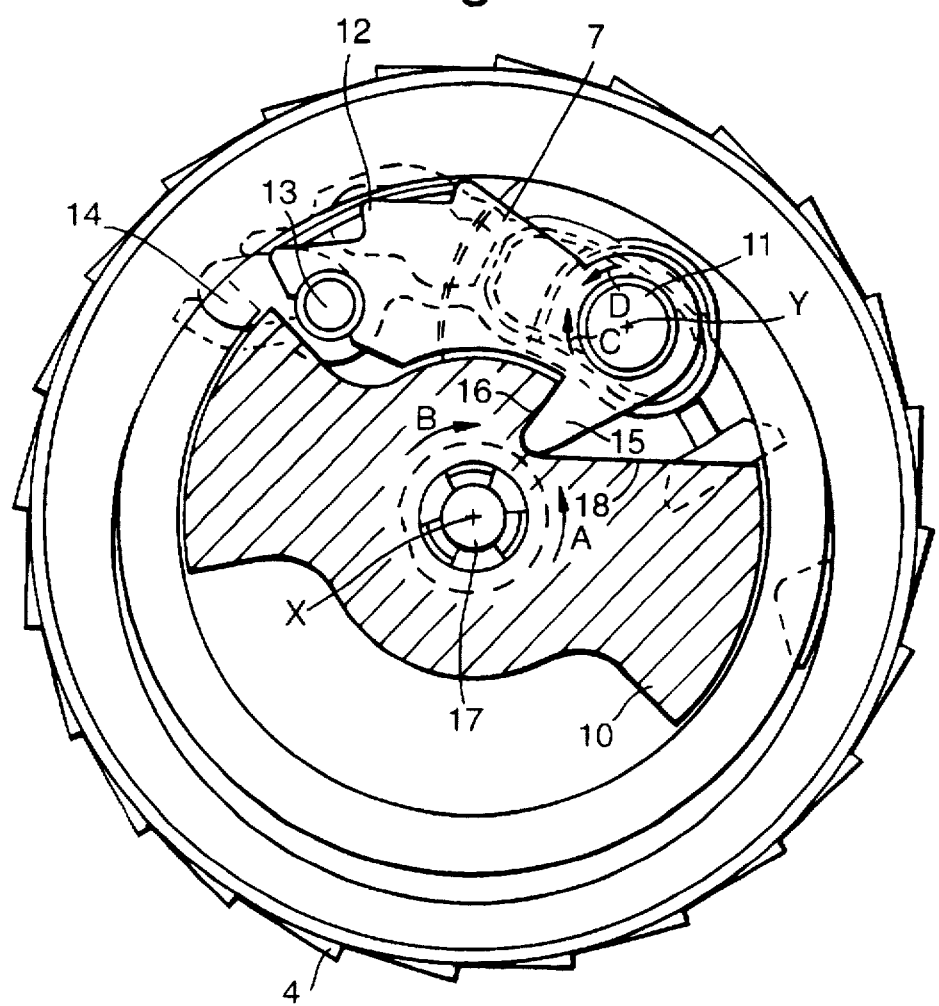
FIG. 2 shows an axial view of one embodiment of the present invention.

FIG. 2 shows an axial view of an embodiment of the present invention which represents an improvement over the known mechanism discussed above. In particular FIG. 2 shows, a pawl 7 which engages a counterbalancing mass 10 and an adjacent lock gear.

Pawl 7 pivots about pin 11 which is mounted eccentrically to a shaft similar to shaft 101 shown in FIG. 1 so that pawl 7 also rotates with the shaft in directions A and B defined about axis X. Teeth 12 of pawl 7 may be moved into engagement with ratchet teeth provided on a frame similar to frame 102 shown in FIG. 1 by pivoting in direction C defined about axis Y of pin 11. Such engagement locks the shaft against further rotation in belt-retraction direction A. Pawl 7 is normally biased out of engagement by the force of a relatively LO weak spring (not shown).

A force in direction C biasing pawl 7 into engagement is provided by cam 13 of pawl 7 which protrudes into cam slot 14 of lock gear 4 and relative rotation between lock gear 4 and the shaft when lock gear 4 is locked by a sensor mechanism (not shown).

Counterbalancing mass 10 is mounted to rotate on bearing 17 coaxially with, but independently of, the shaft. Counterbalancing mass 10 opposes the force in direction C biasing pawl 7 into engagement, because of the contact between contact surface 16 and engagement portion 15 integrally formed on pawl 7. Counterbalancing mass 10 engages pawl 7 and applies thereto a torque which opposes lock gear 4 and prevents pawl 7 moving outwardly. This causes lock gear 4 to rotate with the shaft even at high G-forces until, after a short delay, pawl 7 moves outwardly due to the increase to centrifugal force as the balance of the mechanism is upset by the increasing shaft velocity.

Figure 3:
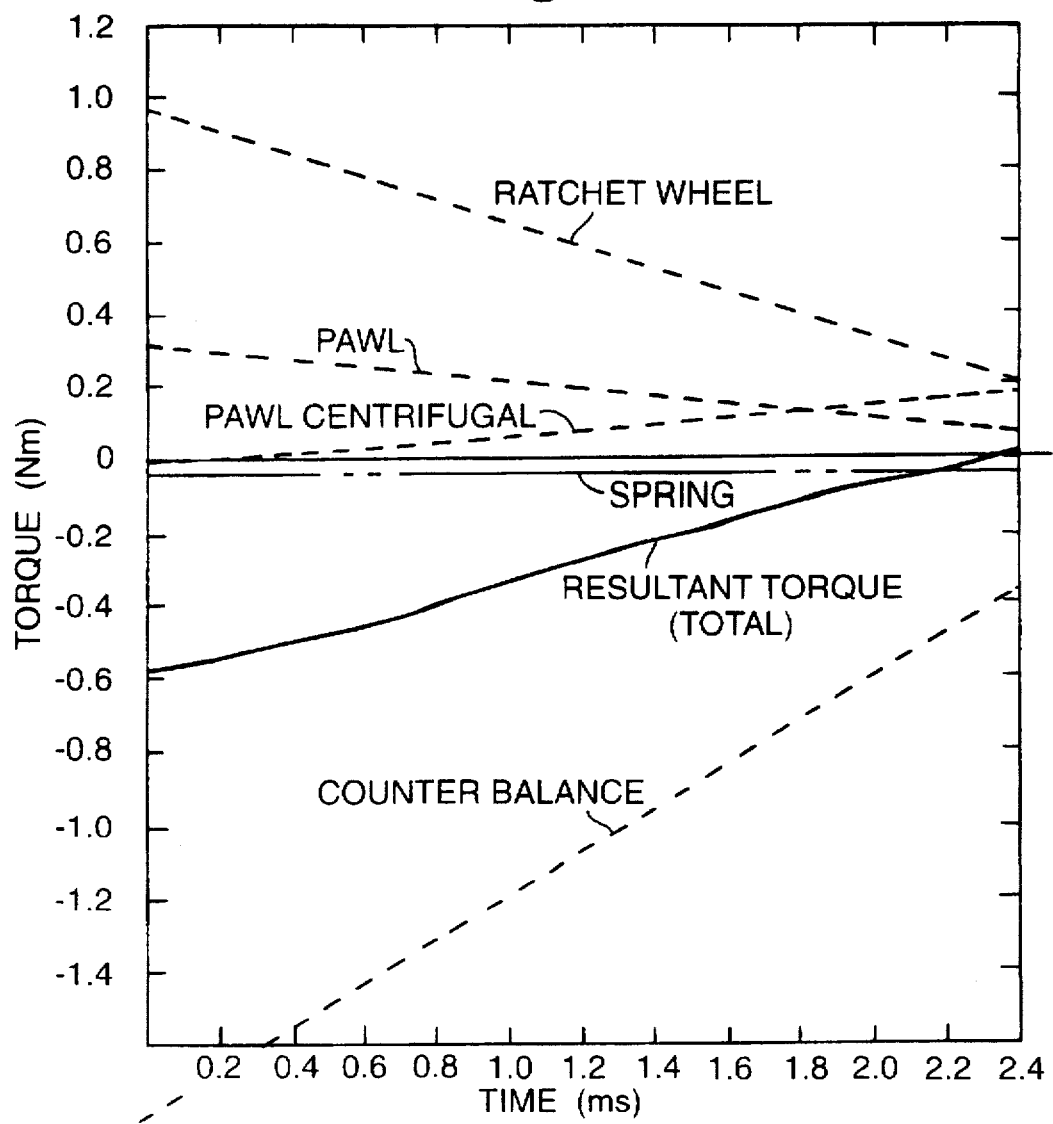
FIG. 3 is a graph illustrating the torques experienced by the pawl in the embodiment of FIG. 2.

The components of torque experienced by pawl 7 in the described embodiment are shown in FIG. 3, wherein the labels for each line indicate the source of each torque component (the label "pawl" refers to the inertial force of the pawl). As can be seen from FIG. 3, the torque from the cam arrangement with lock gear 4 (ratchet wheel) biasing pawl 7 into engagement is initially overcome by the torque from counterbalancing mass 10. The resultant torque is thus negative (ie. in direction D) until between about 2.2 and 2.4 ms after lock gear is first engaged by a sensor. Thereafter there is a resultant torque in direction C forcing pawl 7 into engagement.

The present invention is advantageous for use with retractor pretensioner, where webbing is wound very rapidly onto the shaft. The tendency of pawl 7 to move outwardly due to the deceleration which occurs at the end of retraction is prevented by the opposing torque from counterbalancing mass 10.

On the other hand, a problem may occur in the acceleration phase of the retractor pretensioner, because rotation of counterbalancing mass 10 in direction A can apply a torque to engagement portion 15 tending to rotate pawl 7 in direction C into engagement with the ratchet teeth. In the embodiment of FIG. 2, such a torque arises from the contact between engagement portion 15 and surface 18. This problem can be alleviated by the alternative embodiment shown in FIG. 4.

Figure 4:
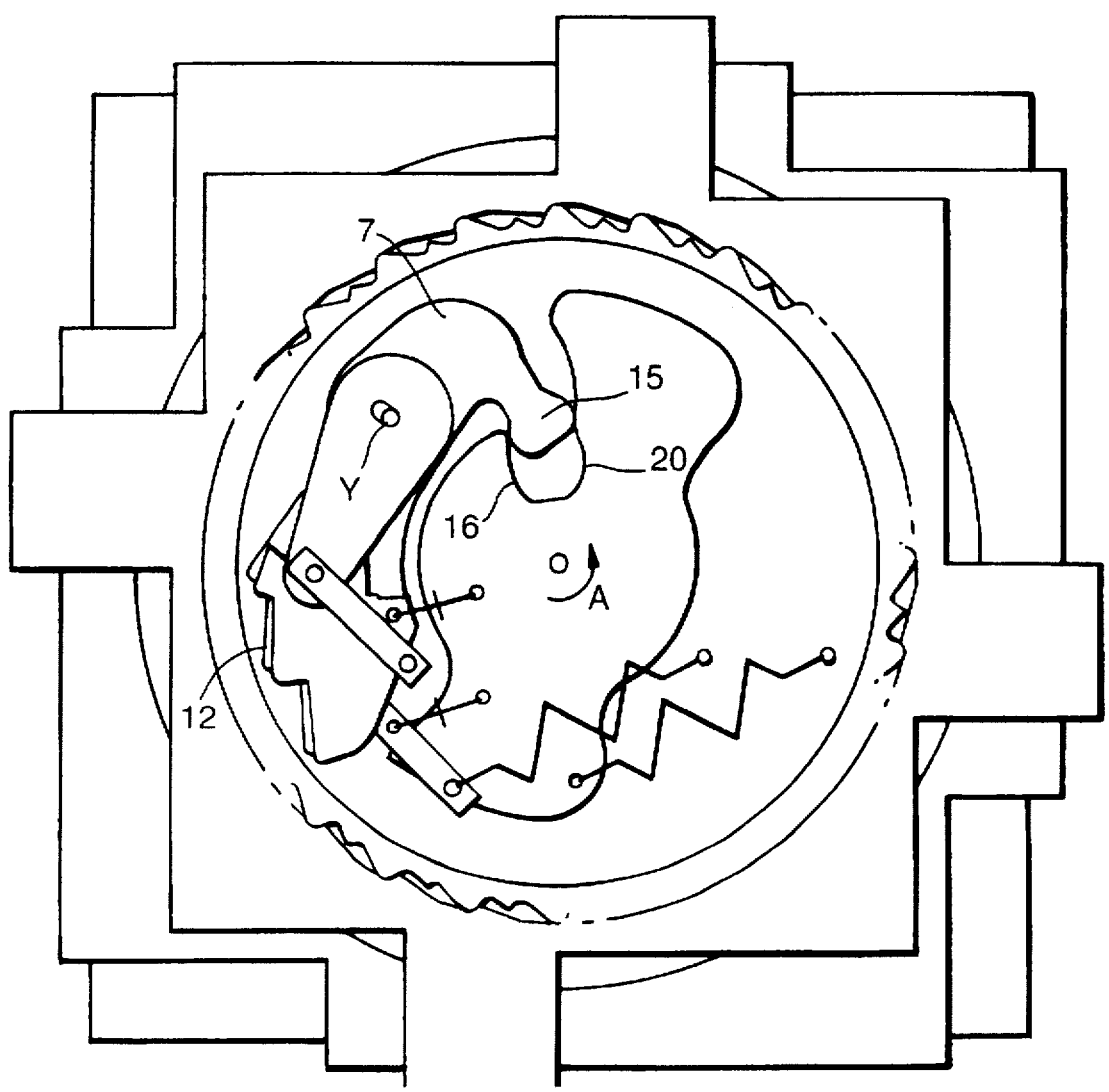
FIG. 4 shows an axial view of an alternative embodiment of the present invention.

The structure and operation of the embodiment of FIG. 4 is basically the same as in the above-described embodiment of FIG. 2. Thus, equivalent components have been given the same reference numerals in FIG. 4 and a repeated description of its operation is superfluous. The parts of FIG. 4 not discussed below also form part of the known ratchet mechanism, as disclosed for example in GB-A-2,263,625 and will be understood from a consideration of that document.

The embodiment of FIG. 4 is different from the embodiment of FIG. 1 in that engagement portion 15 and the mating structure of counterbalancing mass 10 are shaped differently. In particular, engagement portion 15 and the surface 20 of counterbalancing mass 10 which contacts engagement portion 15 when mass 10 rotates in direction A are co-operatively shaped. (This direction is a counter direction to direction B in which mass 10 experiences a force when opposing movement of pawl 7 into engagement.) In particular, portion 15 and surface 20 are shaped such that the contact force therebetween acting on pawl 7 acts along a line passing approximately through the pivot point of pawl 7, ie. axis Y of pin 11. As a result, no torque, or at least a reduced torque, is applied to pawl 7 by contact between engagement portion 15 and surface 20 of mass 10, such as occurs during the acceleration phase of the retractor pretensioner.

Though in both of the above-described embodiments, pawl biasing is provided directly by cam follower 13 protruding from pawl 7 into cam slot 14 of lock gear 4, the present invention equally applies where a different pawl biasing mechanism is provided, as with back-up pawl 107b of the known arrangement of FIG. 1.

Similarly the pawl might move into engagement along a track, rather than pivoting about a point which is the preferred mounting in the described embodiment.

What is claimed is:

1. A retractor engagement mechanism comprising:

a frame;

a ratchet on said frame;

a shaft for windably receiving a webbing said shaft having an axis;

means mounting said shaft rotatably in said frame so as to be rotatable about said axis;

a pawl;

means mounting said pawl eccentrically with respect to said shaft, whereby said pawl is rotatable together with said shaft around said axis of said shaft and whereby said pawl is movable on its mounting into engagement with said ratchet on said frame effective to lock said shaft against rotation relative to said frame;

a lock gear selectably rotatable with said shaft;

a cam-follower connection between said lock gear and said pawl effective to cam said pawl into said engagement when said lock gear is prevented from rotating with said shaft; and a rotatably mounted counterbalancing mass engagable with said pawl for applying to said pawl a force which opposes movement into said engagement, thereby to delay said engagement.

2. A retractor engagement mechanism according to claim 1, wherein said pawl is rotatably mounted and said force applied to said pawl to oppose movement into said engagement produces a torque about the mounting.

3. A retractor engagement mechanism according to claim 1, wherein said counterbalancing mass is rotatable substantially coaxially with said shaft.

4. A retractor engagement mechanism according to claim 1, and further comprising an engagement portion connected to said pawl and a contact surface formed on said counterbalancing mass, whereby said pawl is engagable with said counterbalancing mass by means of contact between said engagement portion and said contact surface.

5. A retractor engagement mechanism according to claim 4, wherein said engagement portion is integrally connected to said pawl.

6. An engagement mechanism according to claim 4, wherein said engagement portion and a second contact surface of the counterbalancing mass are movable into contact with one another by rotation of the counterbalancing mass in a counter direction opposite to the torque experienced by the counterbalancing mass when opposing movement of the pawl into said engagement, and wherein said engagement portion and said second contact surface are shaped effective to cause the force applied to the pawl by rotation of the counterbalancing mass in said counter direction to act substantially through the mounting means of the pawl.

* * * * *